United States Patent [19]
Milberger

[11] Patent Number: 6,102,626
[45] Date of Patent: Aug. 15, 2000

[54] CAISSON WELLHEAD SYSTEM AND METHOD OF INSTALLING THE SAME

[75] Inventor: Lionel J. Milberger, Houston, Tex.

[73] Assignee: ABB Vetco Gray Inc., Houston, Tex.

[21] Appl. No.: 09/124,547

[22] Filed: Jul. 29, 1998

[51] Int. Cl.[7] .............................. F16L 29/16; F16L 31/00
[52] U.S. Cl. .............................. 405/216; 405/211; 285/2; 285/4; 166/364; 166/365
[58] Field of Search ..................... 405/211, 216; 166/363, 364, 365, 368; 285/1–4

[56] References Cited

U.S. PATENT DOCUMENTS

| | | | |
|---|---|---|---|
| 4,139,059 | 2/1979 | Carmichael | 285/4 X |
| 4,289,205 | 9/1981 | Mott | 166/377 |
| 4,424,988 | 1/1984 | Cowx | 285/2 |
| 4,487,527 | 12/1984 | Kelly | 405/211 |
| 4,570,707 | 2/1986 | Setterberg, Jr. | 166/214 |

FOREIGN PATENT DOCUMENTS 2 129 894   5/1984   United Kingdom ............ F16L 37/12

OTHER PUBLICATIONS

Insert tree completion system presentation; K.W. Brands; Apr. 1980.
The Insert Tree Completion System presentation; Klaas W. Brands; May 1981.
Insert Tree Completion System paper; Klaas W. Brands; Sep. 1982.
Cameron Caisson Completion System brochure; no date.

*Primary Examiner*—Eileen Dunn Lillis
*Assistant Examiner*—Tara L. Mayo
*Attorney, Agent, or Firm*—Felsman, Bradley Vaden Gunter & Dillon, LLP; James E. Bradley

[57] ABSTRACT

A caisson wellhead system having a weak point wherein the wellhead system may be installed in a well as a single unit. The caisson wellhead system of the invention includes a lower tubular member having an upper rim. A lower rim of an upper tubular member is placed on the upper end of the lower tubular member. A removable connector is installed inside of and between the lower tubular member and upper tubular member for temporarily connecting the upper tubular member and the lower tubular member. A weak point is formed at the interface between the lower tubular member and the upper tubular member when the removable connector is removed. Therefore, the caisson wellhead system will break at a controlled location if any external components of the well equipment are struck by a foreign object such as an iceberg.

10 Claims, 5 Drawing Sheets

CAISSON WELLHEAD SYSTEM AND METHOD OF INSTALLING THE SAME

TECHNICAL FIELD

This invention relates to a subsea wellhead assembly. More particularly, this invention relates to a wellhead assembly that possess a weak point defined by the interface of an upper tubular member and a lower tubular member so that damage to the well by iceberg scouring or other means may be controlled.

BACKGROUND ART

A danger to subsea wellheads is damage sustained by iceberg scouring. Efforts have been made to protect wellhead assemblies from iceberg scouring by placing wellhead assemblies in excavated areas. Examples of such efforts are taught in U.S. Pat. Nos. 3,461,951 and 3,952,263. Other attempts to protect wellheads include placing covers, shields and anchor devices to protect the subsea wellhead. An example of such a device is taught in U.S. Pat. No. 4,220,421.

U.S. Pat. No. 4,487,527 teaches a wellhead assembly for a subsea well having an anchor base on the bottom surrounding the wellbore of the well. A first conductor in the wellbore is connected to the anchor base, a second conductor has an upper end within the lower end of the first conductor. The anchor base and conductors are cemented in the wellbore. A weak point is created between the first connector and the second connector that is designed to release under iceberg scouring so that the first conductor and the production tubing break away and the second conductor remains in the wellbore.

Although providing a weak point in the well is desirable, a problem with the prior art designs is that time consuming and expensive steps are required to install the equipment necessary to provide a weak point.

SUMMARY OF THE INVENTION

Therefore, it is an object of the invention to provide a caisson wellhead system having a complete release connector or weak point that may be installed in the well as a single unit. The caisson wellhead system of the invention includes a lower tubular member having an upper rim. A lower rim of an upper tubular member is placed on the upper end of the lower tubular member. A removable connector, preferably constructed of a collet surrounded by a backup sleeve is installed inside of and between the lower tubular member and upper tubular member for temporarily connecting the upper tubular member and the lower tubular member. The removable connector has an attachment mechanism that is preferably a slot for receiving a protuberance in a retrieval tool for enabling the retrieval tool to attach to the removable connector to remove the removable connector. A shear point or weak point is formed at the interface between the lower tubular member and the upper tubular member when the removable connector is removed.

In practice, the lower rim of the upper tubular member rests on an upper rim of the lower tubular member and the upper and lower tubular members are secured together with an inner sleeve. The upper tubular member and lower tubular member are lowered together into a bore hole with the inner sleeve holding the upper tubular member and lower tubular member together. Cement is then pumped down and flows upward filling the annulus surrounding the exterior of the upper and lower tubular members as is known in the art. The inner sleeve is then removed so as to provide a shear point at the interface of the lower rim of the upper tubular member and the upper rim of the lower tubular member.

BEST MODE FOR CARRYING OUT THE INVENTION

Figure 1:
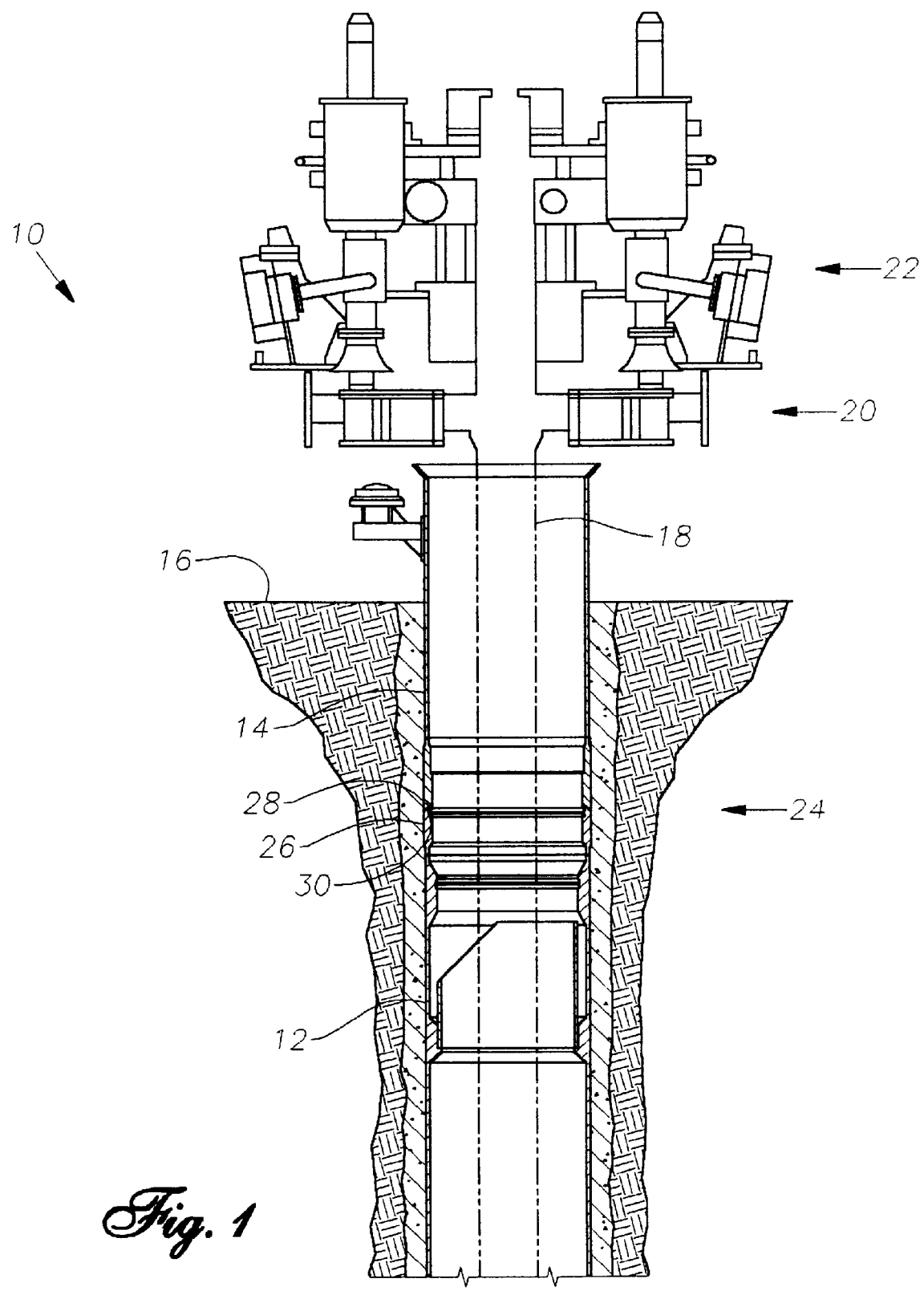
FIG. 1 is a sectional view of a subsea wellhead assembly of the present invention during drilling.

Referring to FIG. 1, shown is a caisson wellhead system designated generally 10. Caisson wellhead system 10 includes a lower tubular member 12 and upper tubular member 14. Lower tubular member 12 and upper tubular member 14 are installed below the ocean floor or mudline 16 in a method that will be explained below. A schematically shown wellhead pipe assembly 18 is shown inserted within the caisson wellhead system 10 and a guide base 20 and Christmas tree 22 are installed in a method known in the art. Upper tubular member 14 and lower tubular member 12 interface to form a complete release connector 24 at shear point 26 located at the interface of lower rim 28 of upper tubular member 14 and upper rim 30 of lower tubular member 12. Preferably, lower rim 28 rests on upper rim 30, but tubular members 12 and 14 are not connected together at shear point 26. Additionally, an o-ring may be provided between lower rim 28 and upper rim 30. Complete release connector 24 is designed to separate at shear point 26 in the event that the external part of the well, which includes the Christmas tree 22 and guide base 20, is impacted by an object such as iceberg 32 visible in FIG. 8.

Referring now to FIGS. 2–5, release connector 24 is shown in sequential installation steps. Upper tubular member 14 is shown with lower rim 28 and lower tubular member 12 is shown with upper rim 30. Lower rim 28 is inclined or bevelled, tapering upward from its outer diameter to its inner diameter. Upper rim 30 is also inclined to mate with lower rim 28, tapering downward from its inner diameter to its outer diameter. A removable connector 34 is installed in a lower portion of upper tubular member 14 for temporarily connecting upper tubular member 14 and lower tubular member 12. Removable connector 34 preferably includes a collet 36, having a plurality of downwardly facing slots 38. Vertical slots 38 enable collet 36 to be radially expanded. Collet 36 is designed to be radially flexible. Annular profile 40 is on a lower exterior portion of landing shoulder 42 on an interior of upper tubular member 14. External rim on collet 36 lands on shoulder 42. Profile 40 extends below rim 28 a short distance.

Figure 3:
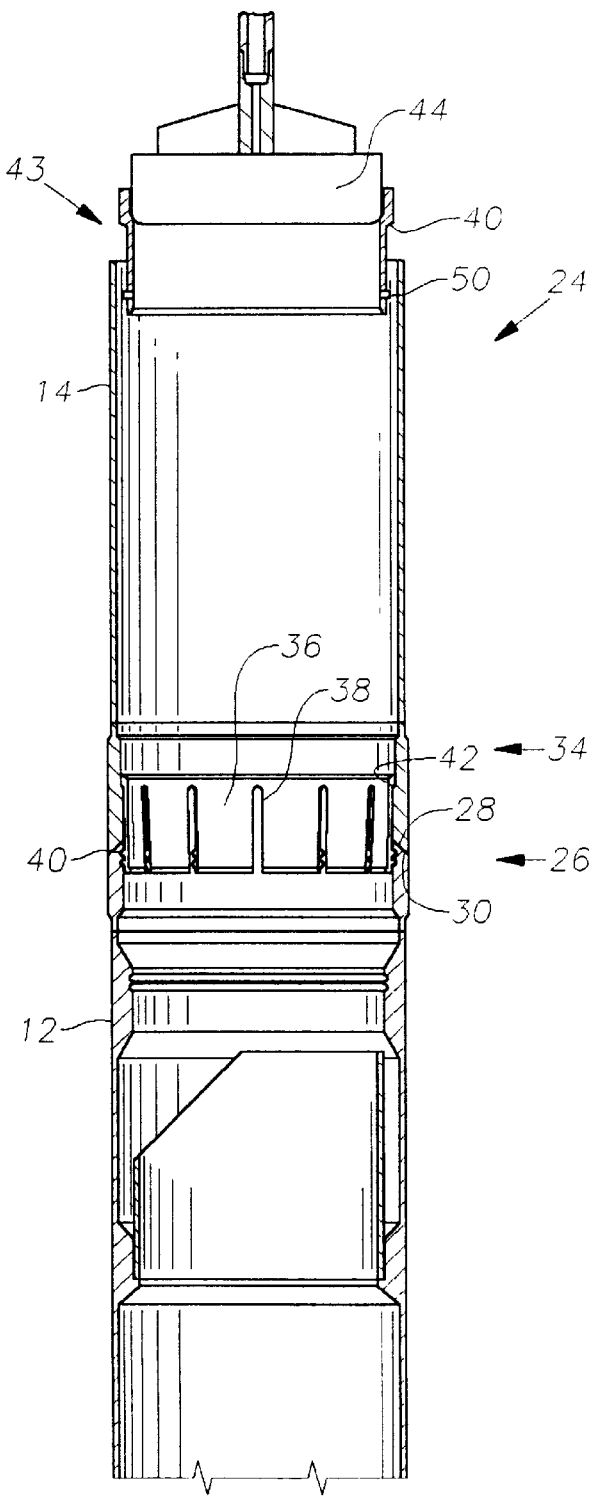
FIG. 3 is a sectional view showing the upper tubular member connected to the lower tubular member.
Figure 7:
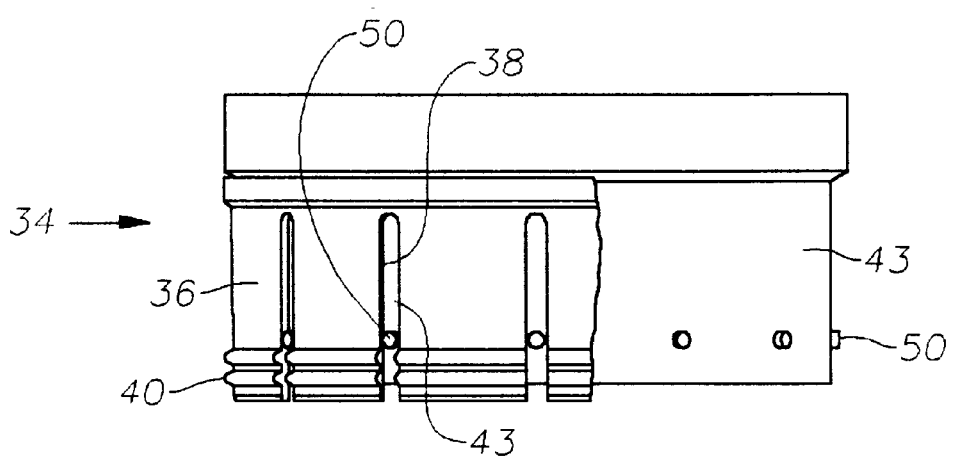
FIG. 7 is an enlarged partial cross-sectional view of the collet engaging the backup sleeve as shown in FIGS. 5 and 6.

Additionally, a back up sleeve 43 is lowered with a running tool 44 to secure removable connector 34 within a lower portion of upper tubular member 14 as shown in FIG. 3. Backup sleeve 43 is a solid ring having a plurality of protruding screws 50 extending therefrom as can be seen most clearly in FIG. 7. The backup sleeve 43 attaches to a running tool 44 for installation in caisson wellhead system 10. Preferably, the attachment mechanism is a slot 38 for receiving a screw or protuberance 50 located on the exterior backup sleeve 43.

Lower tubular member 12 has an interior annular groove 52 near upper rim 30. When collet 36 is positioned in upper tubular member 14, profile 40 engages interior annular groove 52 to secure upper tubular member 14 and lower tubular member 12 together.

Figure 2:
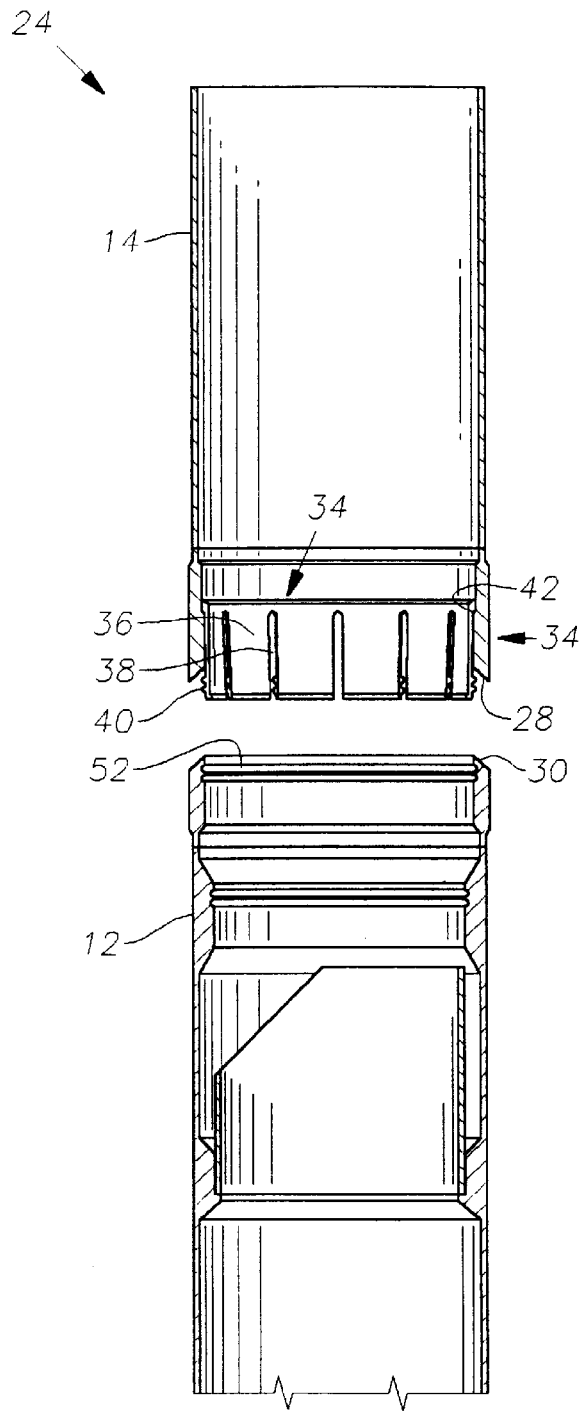
FIG. 2 is a sectional view showing the upper tubular member and lower tubular member.
Figures 4, 5:
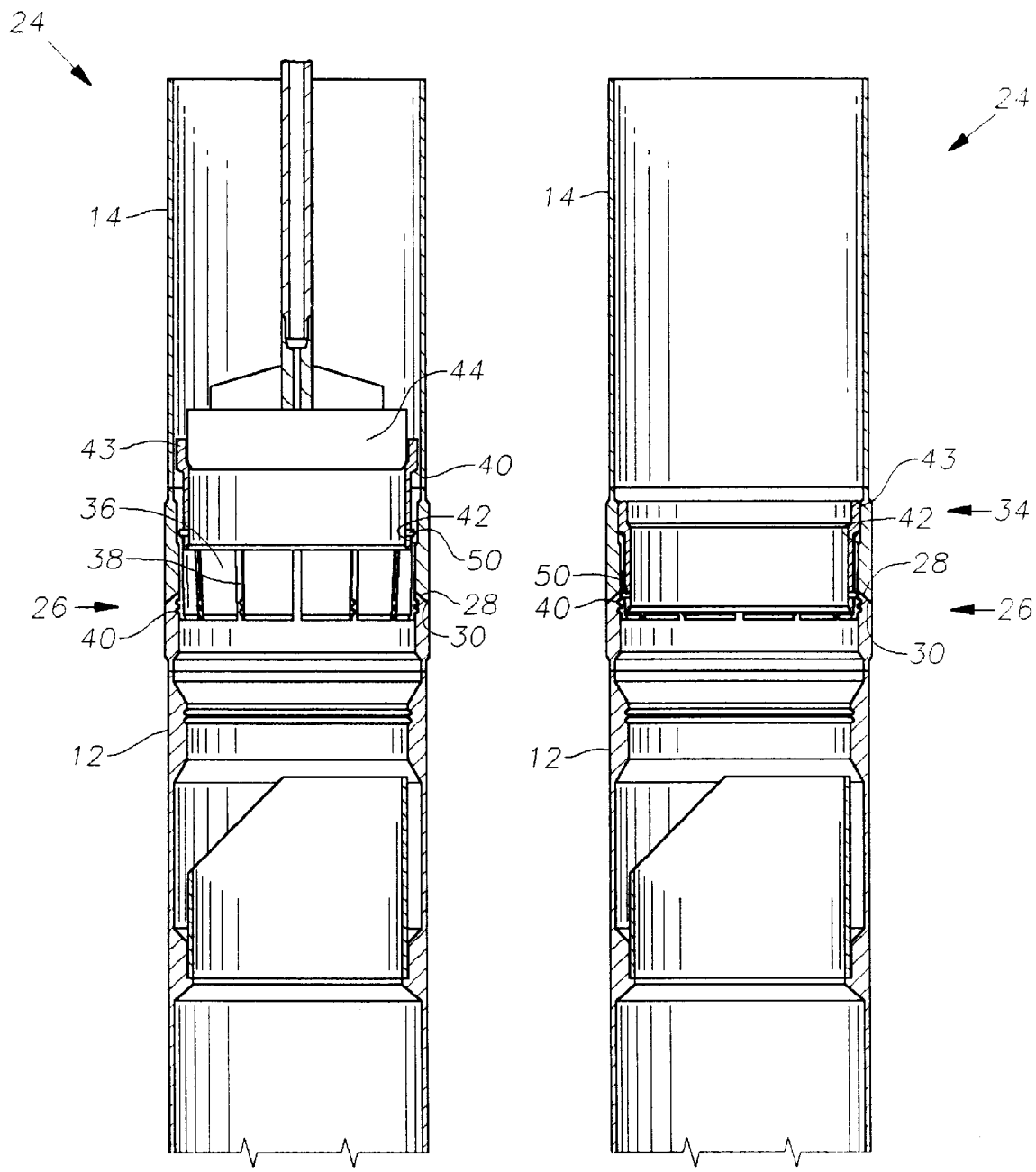
FIG. 4 is a sectional view showing a running tool engaging the removable connector between the upper tubular member and lower tubular member.
FIG. 5 is a sectional view showing the removable connector installed and connecting the upper tubular member and lower tubular member together.
Figure 6:
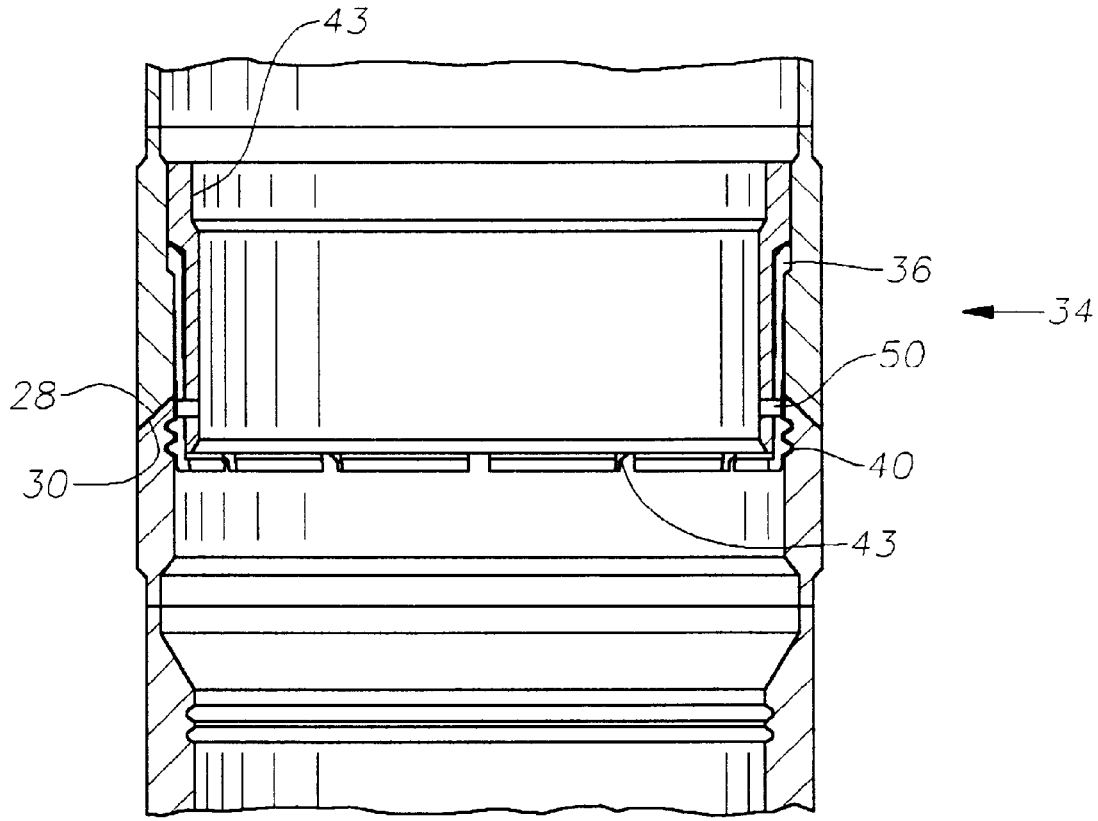
FIG. 6 is an enlarged sectional view of the connection of upper tubular member and lower tubular member as shown in FIG. 5.

In practice, the method of installing the caisson wellhead system 10 having a complete release connector 24 includes the following steps. First, collet 36 is installed in the lower end of upper tubular member 14, as shown in FIG. 2. Then, lower rim 28 of upper tubular member 14 is placed on upper rim 30 of lower tubular member 12. As shown in FIG. 3, collet 36 inserts into the upper end of lower tubular member 14 and profile 40 snaps into engagement with groove 52. Lower rim 28 rests on upper rim 30. Then, backup sleeve 43 is affixed to a running tool 44 and lowered into upper tubular member 14, as shown in FIGS. 3 and 4. FIG. 4 shows backup sleeve 43 partially inserted within collet 36. Running tool 44 forces the backup sleeve 43 into the interior of collet 36, preventing it from deflecting inward. Screws 50 engage some of the slots 38 in collet 36. FIGS. 5 and 6 show the completed removable connector 34 wherein the backup sleeve 43 is pressed within the collet 36 and with the running tool removed.

Figure 8:
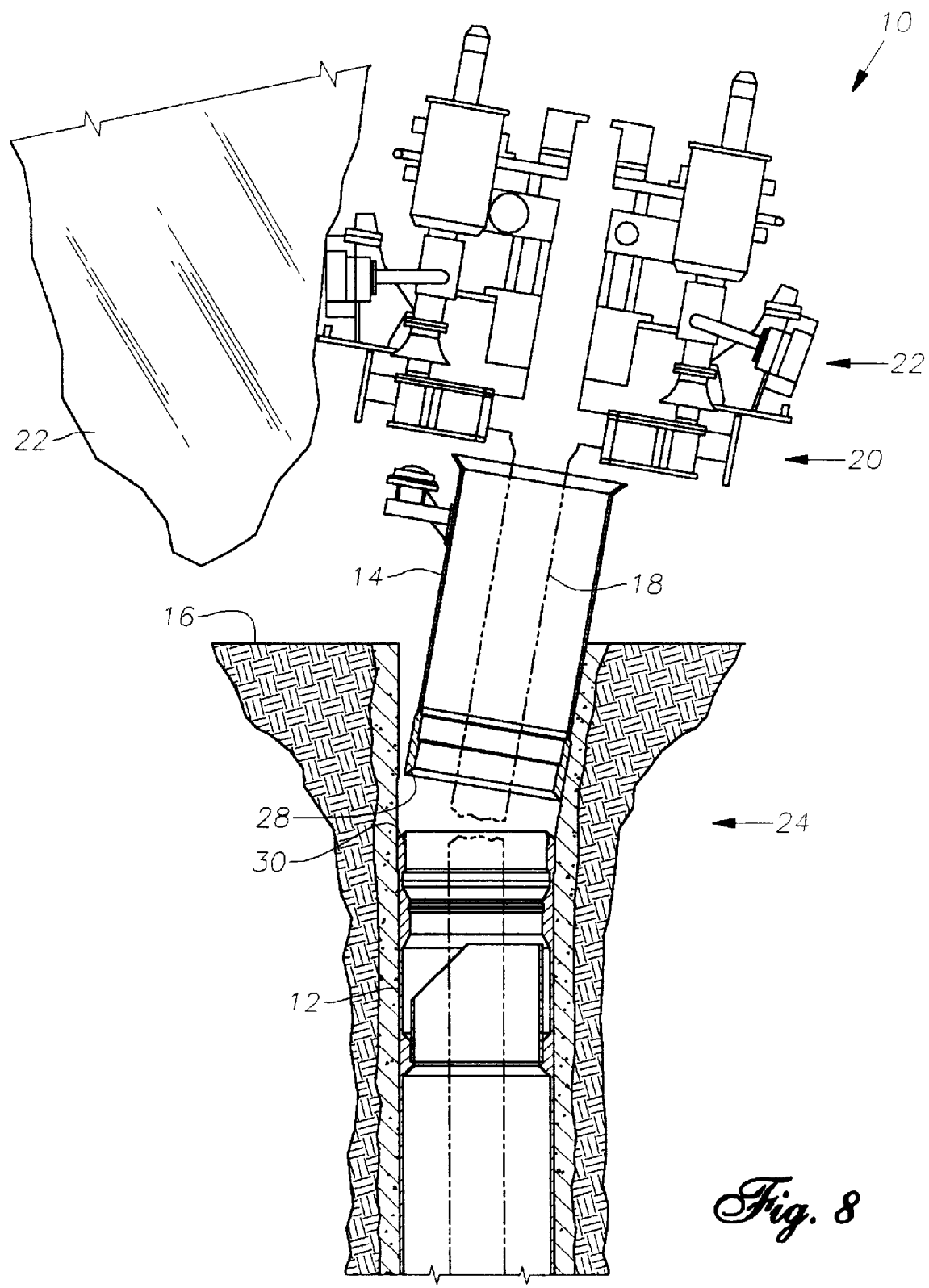
FIG. 8 is a sectional view illustrating the damage of iceberg scouring on a subsea wellhead after completion equipment is run and landed.

After upper tubular member 14 and lower tubular member 12 are secured together with removable connector 34, as shown in FIGS. 5 and 6, thereby forming caisson wellhead system 10, the upper tubular member 14 and lower tubular member 12 are lowered in unison into a borehole. Removable connector 34 secures upper tubular member 14 and lower tubular member 12 together. Cement is then pumped into the annulus surrounding the exterior of the upper tubular member 14 and lower tubular member 12. An o-ring placed between upper tubular member 14 and lower tubular member 12 prevents cement from entering the tubular members at the interface of the upper rim 30 and lower rim 28. Later, the removable connector 34 is removed with a running tool 42. Running tool 42 re-engages backup sleeve and pulls upwardly. This causes screws 50 (visible in FIG. 7) to move upward in slots 38 until reaching upper end of slots. This causes collet 36 to move upward along with backup sleeve 43. FIGS. 5 and 6 show removable connector 34 removed so as to provide shear point 26 at the interface of the upper rim 30 of lower tubular member 12 and the lower rim 28 of upper tubular member 14. Shear point 26 is provided as a point of separation in the event that the well is impacted by foreign objects such as an iceberg 32 (FIG. 8). During drilling of the well, a wellhead assembly 18, including pipe casing and casing hangers will be installed with upper tubular member 14 and lower tubular member 12. The wellhead casing and casing hangers are not shown in FIG. 8 for clarity.

This invention has several advantages. By providing a defined shear point, the point of breakage of the caisson wellhead system may be controlled, thereby limiting damage to crucial well components.

A further advantage is the simplified method of installation of the upper tubular member and lower tubular member, thereby eliminating time and cost for installation of the complete release connector.

While the invention has been shown in only one of its forms, it should be apparent to those skilled in the art that it is not so limited but is susceptible to various changes without departing from the scope of the invention.

I claim:

1. A caisson wellhead system having a complete release connector comprising:

a lower tubular member having an upper rim;

an upper tubular member having a lower rim;

a removable connector for temporarily connecting said upper tubular member and said lower tubular member wherein the upper and lower rims are aligned with each other to run the upper and lower tubular members into the well together, said removable connector having an attachment mechanism for attachment to a retrieval tool; and a shear point being defined between the upper and lower rims when said removable connector is removed.

2. The caisson wellhead system according to claim 1 wherein said removable connector comprises a collet.

3. The caisson wellhead system according to claim 1 wherein said removable connector comprises a backup sleeve surrounding a collet.

4. The caisson wellhead system according to claim 3 wherein said attachment mechanism is a slot for receiving a protuberance in said backup sleeve.

5. A caisson wellhead system having a complete release connector comprising:

a lower tubular member installed in a well bore, said lower tubular member having an upper rim and an interior annular groove proximate to said upper rim;

an upper tubular member having a lower rim that rests on said upper rim;

a collet in said upper tubular member having dogs on a lower end thereof, said dogs for engagement with said interior annular groove; and a backup sleeve positioned around said collet to stabilize the complete release connector.

6. A caisson wellhead system according to claim 5 wherein:

the back up sleeve is removably positioned around said collet to stabilize the complete release connector and a temporary internal connector is removably placed around said collet inside of said backup sleeve.

7. A caisson wellhead system according to claim 6 wherein said collet has slots for engaging an external protuberance on said backup sleeve for removal of said backup sleeve.

8. A method of installing a caisson wellhead system having a complete release connector comprising the steps of:

placing a lower rim of an upper tubular member on an upper rim of a lower tubular member;

securing the upper tubular member to the lower tubular member with a removable connector;

lowering the upper tubular member and lower tubular member in unison into a borehole with the removable connector holding the upper tubular member and lower tubular member together;

pumping cement in the annulus surrounding the exterior of said upper and said lower tubular members;

removing the removable connector so as to provide a shear point at the interface of the upper rim of the lower tubular member and lower rim of the upper tubular member in the event of an impact with a foreign object.

9. The method according to claim 8 wherein the step of removing the connector comprises the steps of lowering a running tool into the borehole and engaging slots in said removable connector with a protuberance on said running tool.

10. The method according to claim 8 wherein said removable connector is comprised of a backup sleeve and a collet.

* * * * *